United States Patent
Wason et al.

(10) Patent No.: US 11,314,938 B2
(45) Date of Patent: Apr. 26, 2022

(54) EXTRACTING ACTIONABLE ITEMS FROM DOCUMENTS AND ASSIGNING THE ACTIONABLE ITEMS TO RESPONSIBLE PARTIES

(71) Applicant: Accenture Global Solutions Limited, Dublin (IE)

(72) Inventors: Prashant Wason, Bengaluru (IN); Sridhar Kapa, Bangalore (IN); Saikat Jana, Bengaluru (IN); Sagar Sanjeev, Patna (IN)

(73) Assignee: Accenture Global Solutions Limited, Dublin (IE)

( * ) Notice: Subject to any disclaimer, the term of this patent is extended or adjusted under 35 U.S.C. 154(b) by 391 days.

(21) Appl. No.: 16/525,172

(22) Filed: Jul. 29, 2019

(65) Prior Publication Data
US 2021/0034703 A1   Feb. 4, 2021

(51) Int. Cl.
*G06F 40/289* (2020.01)
*G06Q 10/06* (2012.01)
*G06F 40/216* (2020.01)

(52) U.S. Cl.
CPC .......... *G06F 40/289* (2020.01); *G06F 40/216* (2020.01); *G06Q 10/06313* (2013.01)

(58) Field of Classification Search
CPC ............. G06F 40/289; G06F 40/216; G06Q 10/06313
USPC .......................................................... 704/9
See application file for complete search history.

(56) References Cited

U.S. PATENT DOCUMENTS

| | | | | |
|---|---|---|---|---|
| 6,353,824 | B1 * | 3/2002 | Boguraev | G06F 16/345 |
| | | | | 715/277 |
| 6,775,677 | B1 * | 8/2004 | Ando | G06F 16/3347 |
| | | | | 707/739 |
| 8,122,031 | B1 * | 2/2012 | Mauro | G06F 16/355 |
| | | | | 707/748 |
| 11,030,406 | B2 * | 6/2021 | Baum | G06F 40/289 |
| 2009/0259506 | A1 * | 10/2009 | Barney | G06Q 40/00 |
| | | | | 705/35 |
| 2016/0026920 | A1 * | 1/2016 | Sullivan | G06F 16/9535 |
| | | | | 706/11 |
| 2017/0116204 | A1 * | 4/2017 | Davulcu | G06F 16/355 |
| 2017/0132203 | A1 * | 5/2017 | Kim | G06F 16/35 |
| 2018/0060302 | A1 * | 3/2018 | Liang | G06F 40/289 |
| 2018/0157664 | A1 * | 6/2018 | Howell | G06N 20/10 |
| 2019/0005328 | A1 * | 1/2019 | Misra | G06F 16/90332 |
| 2020/0081980 | A1 * | 3/2020 | Eisenberg | G06F 16/35 |
| 2020/0411169 | A1 * | 12/2020 | Brown | G06Q 10/063114 |
| 2021/0034703 | A1 * | 2/2021 | Wason | G06F 40/216 |
| 2021/0142117 | A1 * | 5/2021 | Chen | G06K 9/6296 |

OTHER PUBLICATIONS

Fujita, André, Daniel Y. Takahashi, and Alexandre G. Patriota. "A non-parametric method to estimate the number of clusters." Computational Statistics & Data Analysis 73 (2014): 27-39.*

(Continued)

*Primary Examiner* — Edwin S Leland, III
(74) *Attorney, Agent, or Firm* — Plumsea Law Group, LLC

(57) ABSTRACT

A method and system of automatically interpreting documents relating to regulatory directives to automatically identify actionable items and assigning each of the actionable items identified to the appropriate responsible party in a business.

20 Claims, 14 Drawing Sheets

(56) References Cited

OTHER PUBLICATIONS

Examination Report dated Nov. 3, 2020 for Australian Patent Application No. 2020207818.
Mohit Joshi, "AI Tames the Complexitiy of Regulation in Financial Services", published 2017; https://www.infosys.com/insights/ai-automation/ai-tames-complexity.html [retrieved Jan. 7, 2020].
Clyde Wayne Crews, "Ten Thousand Commandments 2017—An Annual Snapshot of the Federal Regulatory State", published May 31, 2017; https://cei.org/10kc2017 [retrieved Jan. 7, 2020].
Tony Clark, "Top 5 regulatory concerns currently facing financial institutions", published May 14, 2018; https://www.worldfinance.com/stralegy/top-five-regulatory-concerns-currently-facing-financial-institutions [retrieved Jan. 7, 2020].
Lucy McNulty, "Compliance costs to more than double by 2022", published Apr. 27, 2017; https://www.fnlondon.com/articles/compliance-costs-to-more-than-double-by-2022-survey-finds-20170427 [retrieved Jan. 7, 2020].
Beverly Rich, "How AI is changing contracts", published Feb. 12, 2018; https://hbr.org/2018/02/how-ai-is-changing-contracts [retrieved Jan. 7, 2020].
Peter Liddell et al., "Supply chain capacity management—key to value", published Mar. 21, 2017; https://home.kpmg/au/en/home/insights/2017/03/supply-chain-capacity-management.html [retrieved Jan. 7, 2020].

Tim Cummins, "Cost of processing a basic contract soars to $6900", published 2017; https://blog.lawgeex.com/contractcosts/ [retrieived Jan. 7, 2020].
Tim Cummins, "The cost of a contract", published Nov. 2, 2017; https://blog.iaccm.com/commitment-matters-tim-cummins-blog/the-cost-of-a-contract [retrieived Jan. 7, 2020].
Caroline Cakebread, "You're not alone, no one reads terms of service agreements", published Nov. 15, 2017; https://www.businessinsider.in/youre-not-alone-no-one-reads-terms-of-service-agreements/articleshow/61659553.cms [retrieved Jan. 7, 2020].
Katharine Kemp, "94% of Australians do not read all privacy policies that apply to them—and that's rational behaviour", published May 13, 2018; https://theconversation.com/94-of-australians-do-not-read-all-privacy-policies-that-apply-to-them-and-thats-rational-behaviour-96353 [retrieved Jan. 7, 2020].
Rebecca Smithers, "Terms and conditions: not reading the small print can mean big problems", published May 11, 2011; https://www.theguardian.com/money/2011/may/11/terms-conditions-small-print-big-problems [retrieved Jan. 7, 2020].
Keith Wagstaff, "You'd Need 76 Work Days to Read All Your Privacy Policies Each Year", published Mar. 6, 2012; http://techland.time.com/2012/03/06/youd-need-76-work-days-to-read-all-your-privacy-policies-each-year/ [retrieved Jan. 7, 2020].

\* cited by examiner

EXTRACTING ACTIONABLE ITEMS FROM DOCUMENTS AND ASSIGNING THE ACTIONABLE ITEMS TO RESPONSIBLE PARTIES

TECHNICAL FIELD

The present disclosure generally relates to using artificial intelligence (AI) to interpret documents. More specifically, the present disclosure generally relates to interpreting documents to aid responsible parties, such as the officers and departments of a business or other organization, in performing actionable items.

BACKGROUND

Compliance with regulatory directives is a complicated and expensive process. The total number of regulatory publications, changes, and announcements continue to increase every year worldwide. For example, there are currently more than 750 global regulatory bodies and governing businesses. Each of these regulatory bodies and governing business distributes new regulatory directives each year. These regulatory directives are often provided as voluminous documents that are difficult to distill into the "actionable items" necessary for responsible parties (e.g., officers and departments of a business) to perform. Thus, it is difficult to for responsible parties to understand what actionable items these documents impose on the responsible parties.

Currently, the documents for regulatory directives are interpreted manually. For example, businesses and/or by experts hired by businesses manually interpret the documents. This manual interpretation can be time-consuming and expensive and can result in inconsistencies in the interpretation of the documents.

Regulatory directives are not the only documents that are difficult to distill into actionable items. For example, the same problem can occur with documents relating to legal contracts, information technology, tax directives, training manuals, company filings, privacy policies, etc.

There is a need in the art for a system and method that addresses the shortcomings discussed above.

SUMMARY

In one embodiment, the present invention provides a method and system of automatically interpreting documents relating to regulatory directives to automatically identify actionable items and assigning each of the actionable items identified to the appropriate responsible party in a business to thereby provide a significant time saving and cost saving by reducing the necessity of one or more people having to manually read an entire document to extract actionable items in a document relating to regulatory directives while also ensuring that the responsible parties in a business or organization do not miss actionable items in the document.

In one embodiment, the present disclosure provides k-means clustering method for automatically determining the optimal number of clusters of topic phrases using a slope variance method. Such a determination cannot be made using the elbow method for finding the optimal number of clusters, because there is no concrete elbow point for n/3 where n=number of sentences using the elbow method for finding the optimal number of clusters.

In one aspect, the disclosure provides a method for interpreting one or more documents to extract actionable items in the one or more documents and assigning the actionable items to responsible parties for the actionable items comprising: for each sentence of one or more sentences of each document of the one or more documents automatically extracting actionable items for each entity of one or more entities mentioned in each document; automatically identifying topic phrases for each sentence of the one or more sentences based on the extracted actionable items; automatically clustering the identified topic phrases into groups of topic phrases; automatically labeling each respective group of the groups of topic phrases with a respective group label; building a model for each group of topic phrases based on the respective group label for each respective group of the groups of topic phrases; automatically determining sentence similarity within each group of topic phrases based on the model for each respective group; and automatically assigning respective groups to one or more respective responsible parties in a business based on the respective group label for each group.

In yet another aspect, the disclosure provides a non-transitory computer-readable medium storing software that may comprise instructions executable by one or more computers which, upon such execution, cause the one or more computers to: for each sentence of one or more sentences of each document of the one or more documents automatically extracting actionable items for each entity of one or more entities mentioned in each document; automatically identifying topic phrases for each sentence of the one or more sentences based on the extracted actionable items; automatically clustering the identified topic phrases into groups of topic phrases; automatically labeling each respective group of the groups of topic phrases with a respective group label; building a model for each group of topic phrases based on the respective group label for each respective group of the groups of topic phrases; automatically determining sentence similarity within each group of topic phrases based on the model for each respective group; and automatically assigning respective groups to one or more respective responsible parties in a business based on the respective label for each group.

In yet another aspect, the disclosure provides a system for interpreting one or more documents to extract actionable items in the one or more documents and assigning the actionable items to responsible parties for the actionable items, comprising: one or more computers and one or more storage devices storing instructions that are operable, when executed by the one or more computers, to cause the one or more computers to: for each sentence of one or more sentences of each document of the one or more documents automatically extracting actionable items for each entity of one or more entities mentioned in each document; automatically identifying topic phrases for each sentence of the one or more sentences based on the extracted actionable items; automatically clustering the identified topic phrases into groups of topic phrases; automatically labeling each respective group of the groups of topic phrases with a respective group label; building a model for each group of topic phrases based on the respective group label for each respective group of the groups of topic phrases; automatically determining sentence similarity within each group of topic phrases based on the model for each respective group; and automatically assigning respective groups to one or more respective responsible parties in a business based on the respective group label for each group.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

In some embodiments, the first step in processing the documents may include determining which documents contain actionable items. For example, natural language understanding may be used to process each sentence of the documents to determine which sentences include actionable item. The sentences containing actionable items may be further processed to identify entities (e.g., authorities requiring regulatory compliance) mentioned within the same sentences. As discussed in more detail below, the sentences may be displayed with the actionable items and the entities. The sentences containing actionable items may be further processed to determine topic phrases describing the meaning of the sentences. For example, as discussed in more detail below, in some embodiments, a term frequency-inverse document frequency (TF-IDF) model may be used to determine the topic phrases. Then, the topic phrases may be clustered to determine groups of like topic phrases. For example, in some embodiments, a K-means clustering using a slope variance method may be used to cluster the topic phrases into like groups. Then, the groups/clusters may each be given a group label by identifying the most frequent words in the topic phrases and performing a series stemming algorithms on the most frequent words.

Depending on the type of documents to be interpreted, an AI system of the present disclosure may be trained with a theme specific corpus of data for the particular type of documents being interpreted.

In some embodiments, for each document fed into the system, natural language processing (NLP) based dependency parsing is performed to identify: entities mentioned in each document, coreferences and information to extract. For each entity identified in each document, all of the actionable items in the document are identified. For purposes of the present disclosure an "entity" or "subject" may be a country, a state, a domestic regulatory agency, a foreign regulatory agency, an international regulatory, an organization, or a business.

The most important words or phrases for each sentence in each document are identified to identify topic phrases. The topic phrases and sentences that contain the topic phrases are then clustered/grouped. The groups/clusters are identified. The groups/clusters are each labeled.

A model is then created for each identified group/cluster.

Figure 1:
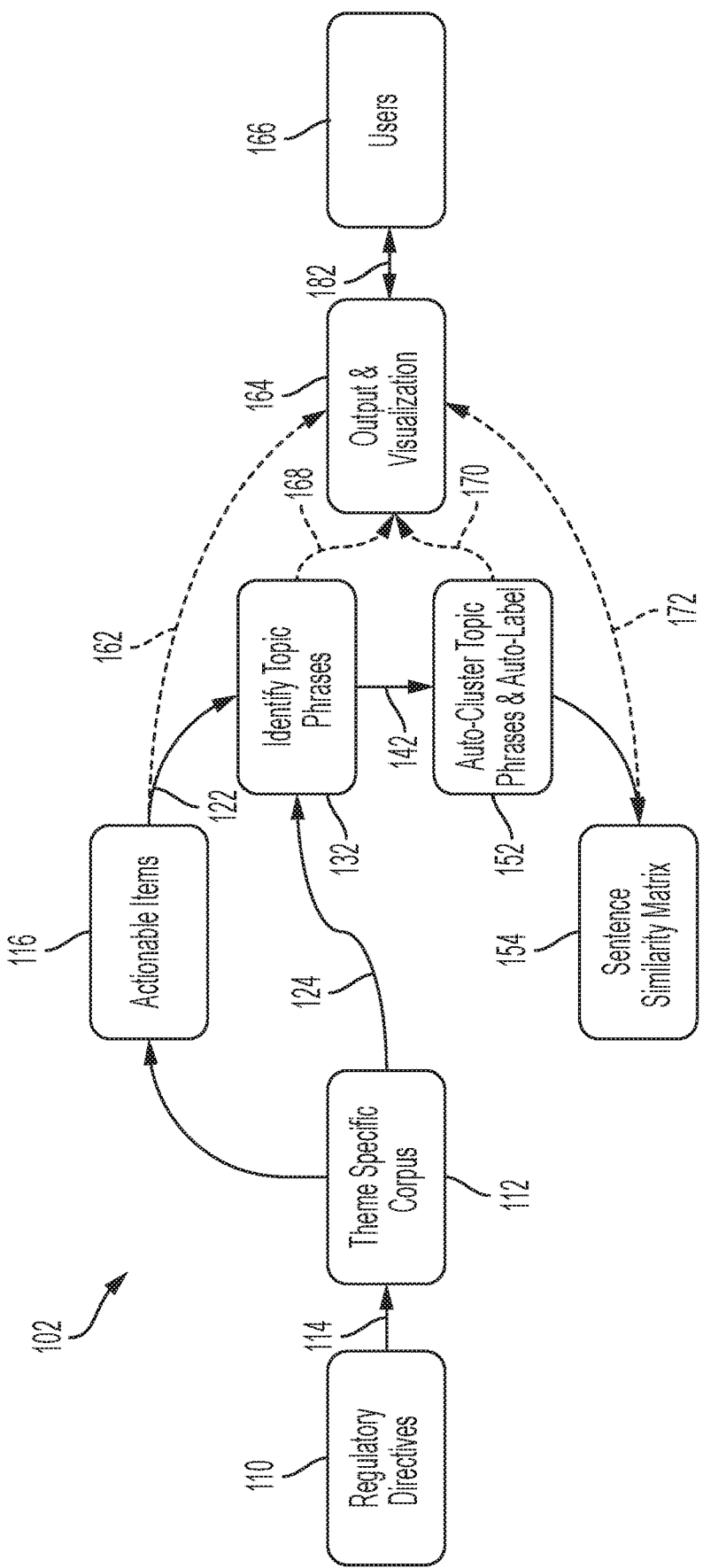
FIG. 1 is a schematic diagram of a system according to an embodiment illustrating how the regulatory directives in one or documents are processed to extract actionable items and to display actionable items to users.

FIG. 1 is a schematic diagram of a document interpretation system 102 according to one embodiment of the present disclosure. Regulatory directives 110 are input into system 102 in the form of documents. The regulatory directives may be original directives and/or amended regulatory directives. The regulatory directives are documents including one or more types of regulations, such as financial services regulations, health care regulations, insurance regulations, etc.

Document interpretation system 102 has been previously trained using theme specific corpus 112 and also continues to be trained with input regulatory directives 110. Dependency parsing is performed as indicated at arrow 114 to identify the actionable items in each document in actionable items subsystem 116. Actionable items, indicated by arrow 122 and sentences, indicated by arrow 124, from the documents of regulatory directives 110 are used to identify topic phrases in identify topic phrases subsystem 132. Identified topic phrases, indicated by arrow 142, are automatically clustered/grouped and automatically labeled in auto-cluster topic phrases & auto-label subsystem 152. Groups of topic phrases, along with the sentences for which they are topic phrases, are used by sentence similarity matrix subsystem 154 to produce a sentence similarity matrix. Dashed arrow 162 illustrates that actionable items are and visualized by output & visualization subsystem 164 to users 166. Dashed arrow 168 illustrates that topic phrases are output and visualized by output & visualization subsystem 164 to users 166. Dashed arrow 170 illustrates that clustered and labeled topic phrases are output and visualized by output & visualization subsystem 164 to users 166. Dashed arrow 172 illustrates that the sentence similarity matrix produced by sentence similarity matrix subsystem 154 are output and visualized by output & visualization subsystem 164 to users 166. Two-headed arrow 182 illustrates that information is both displayed to users 166 by output & visualization subsystem 164 and that users 166 can interact with the displayed information, for example, by comparing various outputs.

Figure 2:
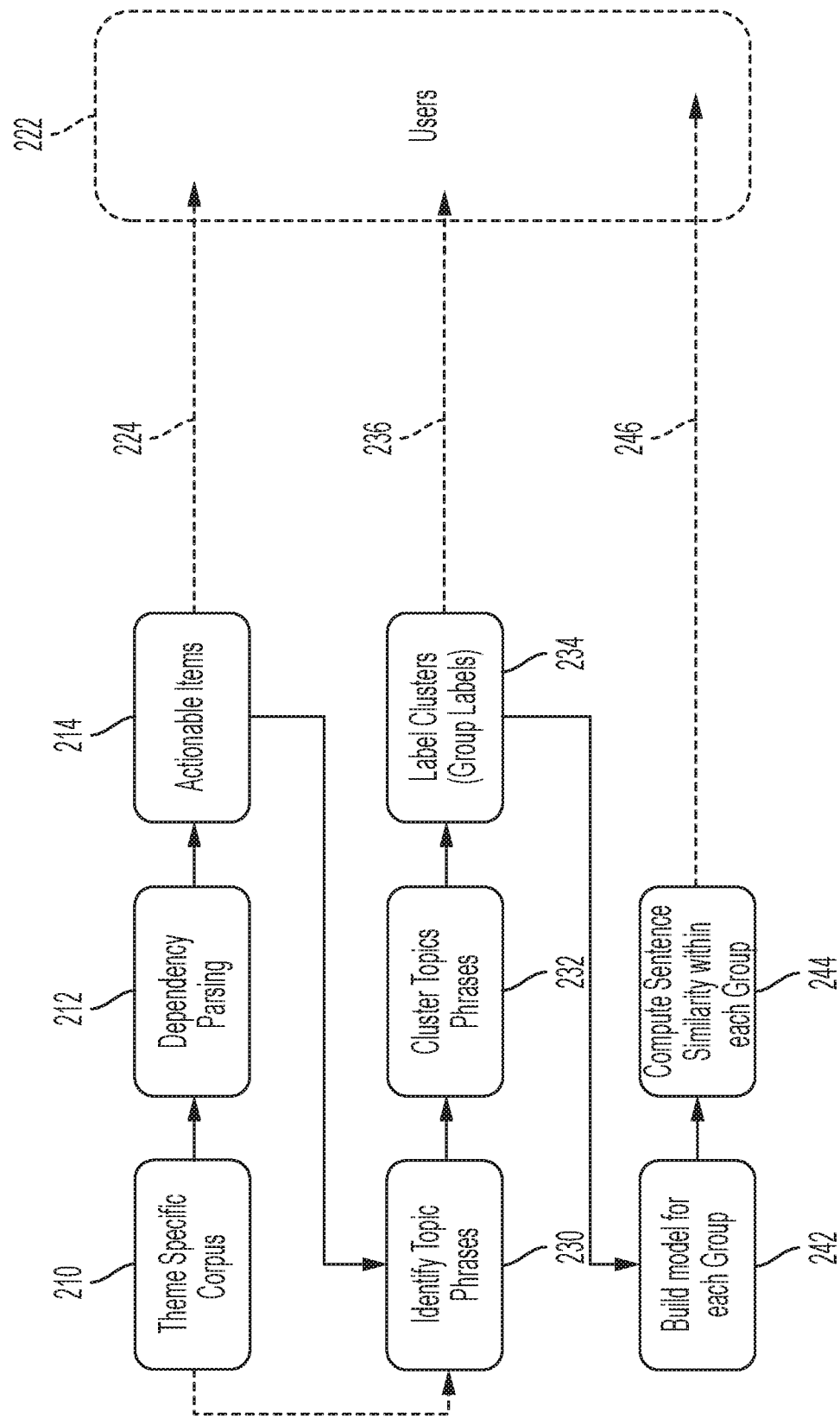
FIG. 2 is a schematic diagram illustrating additional details of the system of FIG. 1.

FIG. 2 is a schematic diagram illustrating additional details of system 102 of FIG. 1. Based on theme specific corpus 210, dependency parsing is carried out in dependency parsing subsystem 212 in which actionable items are identified and extracted in actionable items subsystem 214 and then displayed to users 222 as indicated by dashed arrow 224. Actionable items are displayed to users 222 in a variety of forms such as an actionable items tree, a display comparing actionable items, a knowledge graph, a knowledge graph based virtual assistant, etc., Topic phrases are identified using the actionable items identified and extracted in topic phrases identification subsystem 230. The topic phrases are clustered into groups in cluster topic phrases subsystem 232 and the groups are labeled in cluster labeling subsystem 234. The labeled groups and topic phrases are displayed to users 222 as indicated by dashed arrow 236. The labeled groups and topic phrases are displayed to users 222 in a variety of ways such as a cluster of groups and/or topics, a tree of groups and/or topics, a holistic view of groups vs. all documents, a comparison of documents. A model is built for each labeled group in model building subsystem 242. That is, for each labeled group, a genism doc2vec model is built. Because there is a model for every group, the scope lies within each cluster/group and the output of system 102 is accurate. Sentence similarity within each group is computed in sentence similarity computing subsystem 244 and sentence similarity is displayed users 222 as indicated by dashed arrow 246. Sentence similarity may be displayed to users 222 in a variety of ways including as a correlation view of similar sentences, etc.

Figure 3:
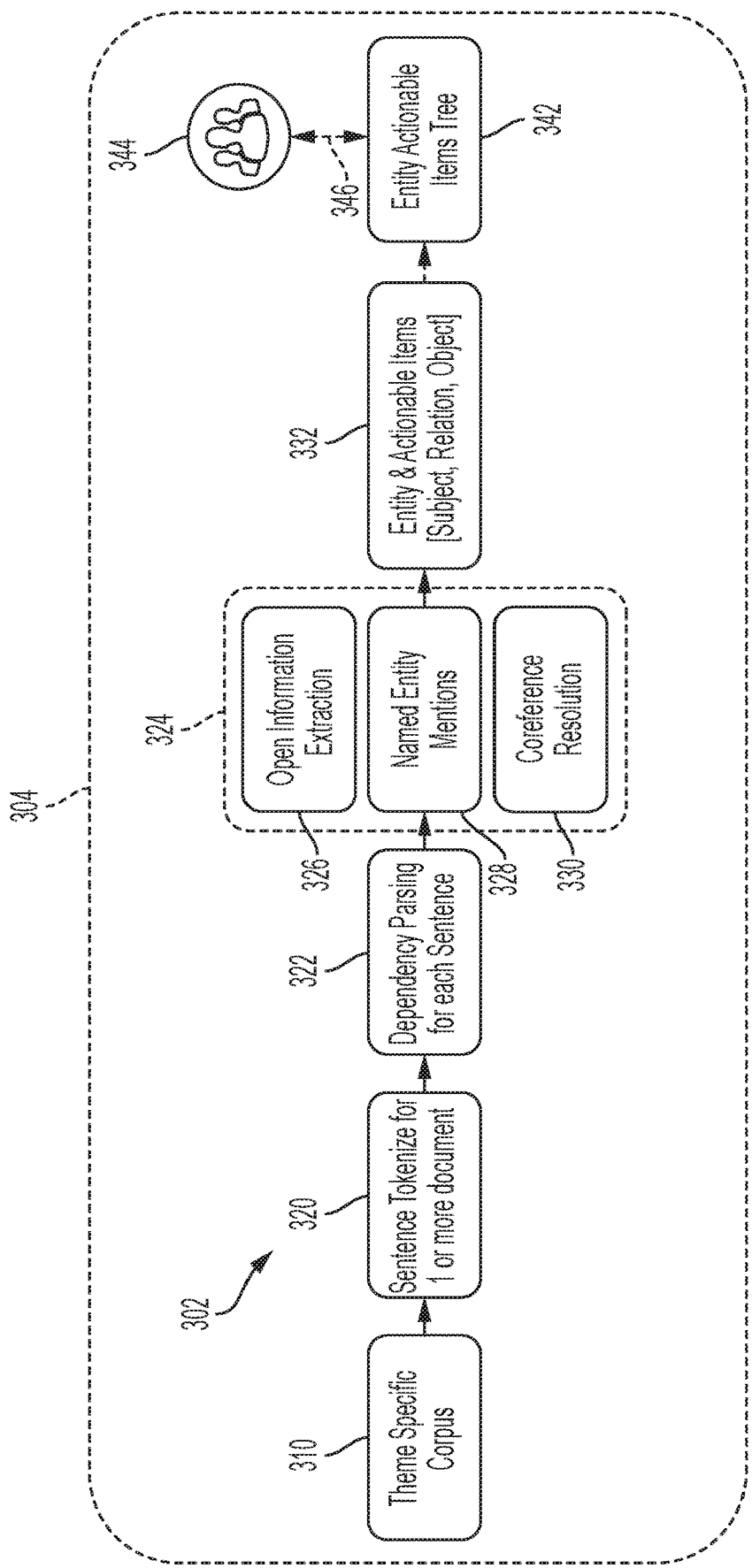
FIG. 3 is a schematic diagram illustrating an entity and action item extraction subsystem of a system according to an embodiment.

In one embodiment of the present disclosure, an entity/subject and actionable items may be extracted and displayed to a user as shown in FIG. 3. FIG. 3 shows an entity and action item extraction subsystem 302 of a document interpretation system 304 according to one embodiment of the present disclosure. In FIG. 3, documents are input into document interpretation system 304, in which, based on theme specific corpus 310, each document is sentence tokenized by tagging each sentence with a document or a directive name in sentence tokenizing subsystem 320. In dependency parsing subsystem 322, all sentences are dependency parsed one-by-one using Stanford Core natural language processing (NLP) which provides a JavaScript Object Notation (JSON) output. Subsystem 324 includes three sub-subsystems, open information extraction sub-subsystem 326, named entity mentions sub-subsystem 328 and coreference resolution sub-subsystem 330. In open information extraction sub-subsystem 326 open information extraction is performed by traversing the JSON output to extract all openIE triples in the format Subject, Relationship, Object. In named entity mentions sub-subsystem 328, subjects for each sentence are filtered by entity mentions. In coreference resolution sub-subsystem 330, co-references are resolved. In entity and actionable items subsystem 332, actionable item trees are plotted for each subject and the actionable item trees are displayed by display subsystem 342 to users 344. The actionable item trees are both displayed to users 344 and users may interact with the actionable item trees as indicated by double-headed arrow 346.

Figure 4:
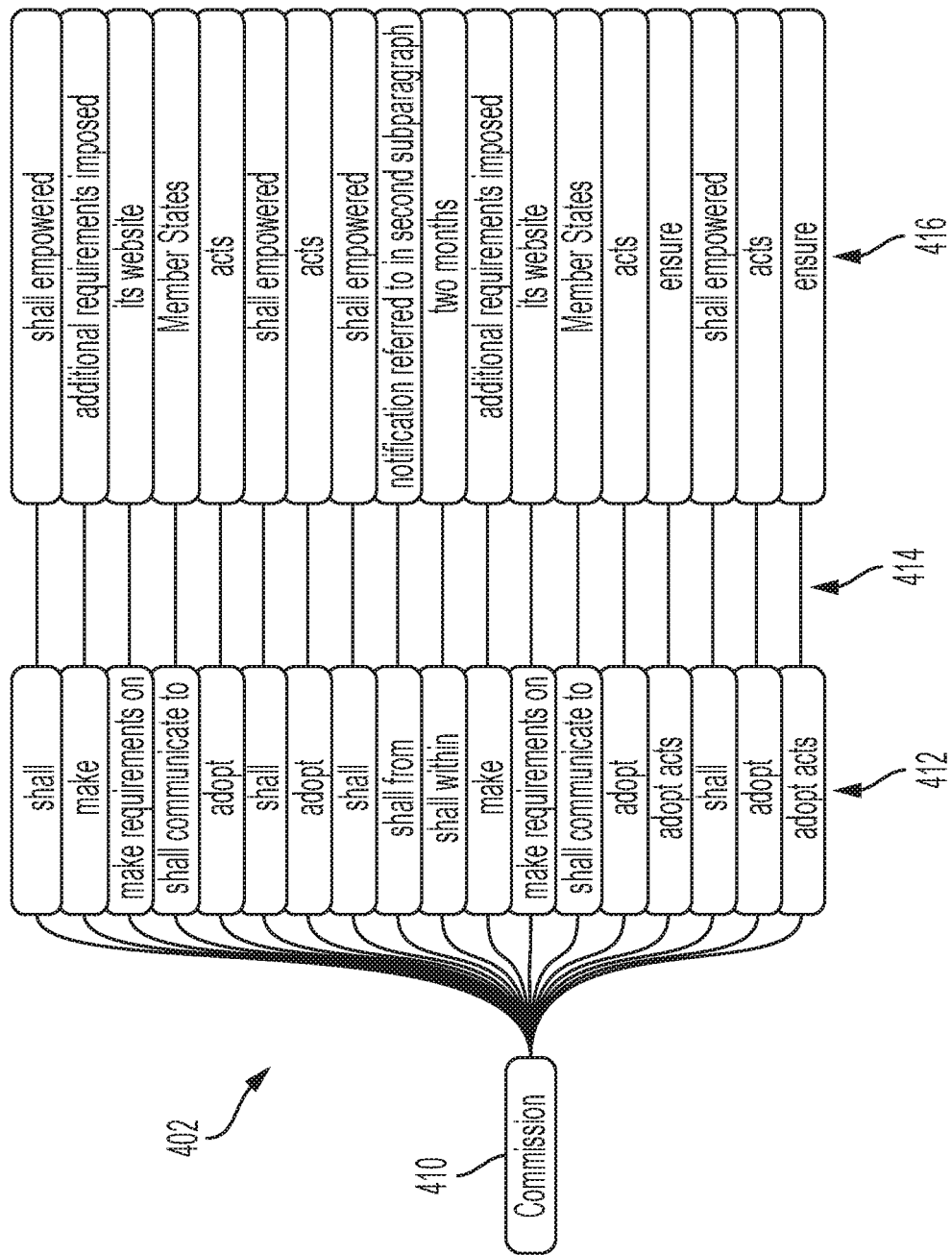
FIG. 4 is a schematic diagram illustrating part of an actionable item tree as displayed to a user according to an embodiment.

FIG. 4 shows part of an actionable item tree 402 as displayed to a user for the subject/entity "Commission" 410 according to one embodiment of the present disclosure. In actionable item tree 402 are word relationships 412 for subject/entity "Commission". Connected by connectors 414 to respective word relationships 412 for subject/entity "Commission" 410 are respective objects 416.

Figure 5:
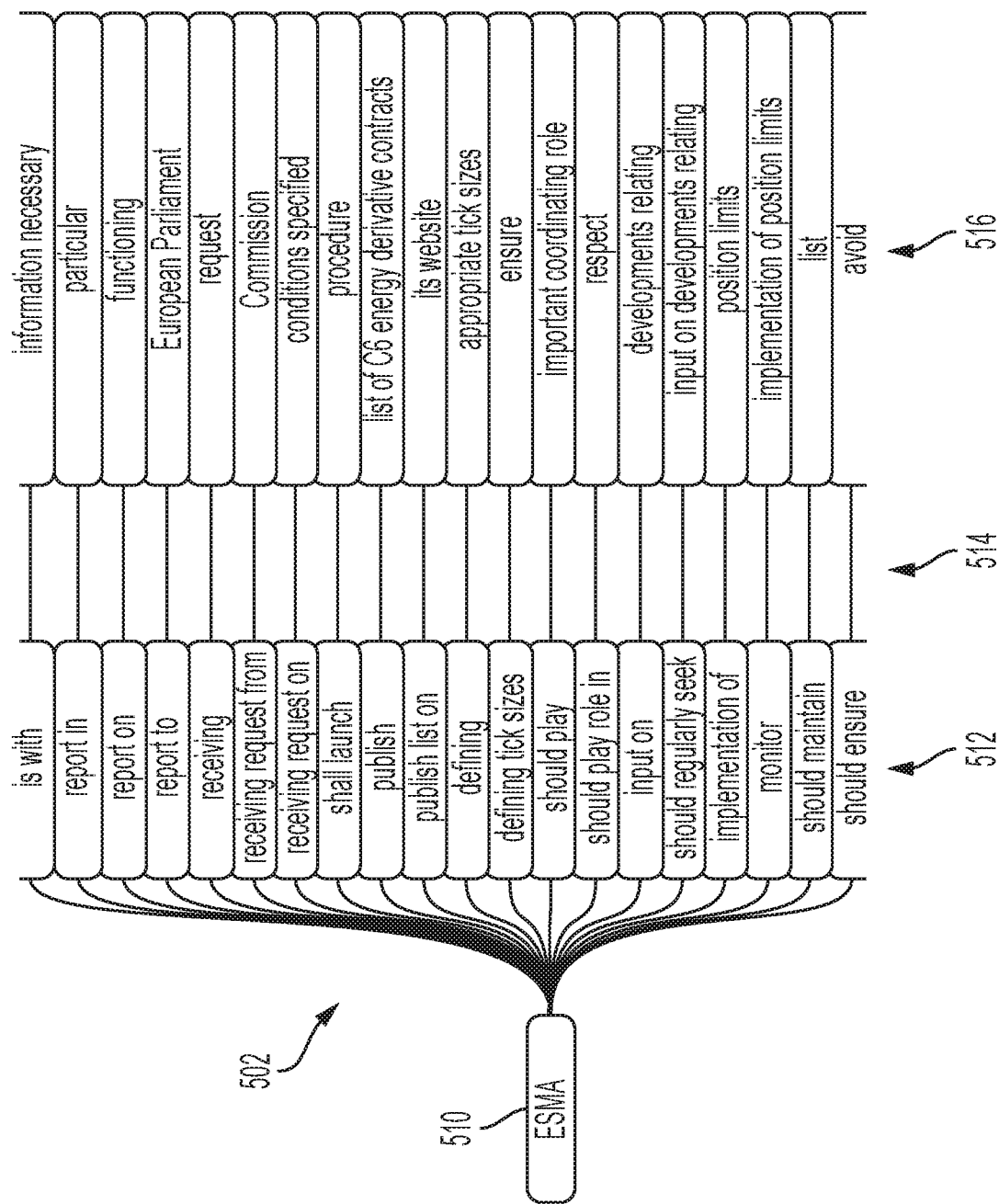
FIG. 5 is a schematic diagram illustrating part of an actionable item tree as displayed to a user according to an embodiment.

FIG. 5 shows part of an actionable item tree 502 as displayed to a user for subject/entity "The European Securities and Markets Authority (ESMA)" 510 according to one embodiment of the present disclosure. In actionable item tree 502 are word relationships 512 for subject/entity "ESMA" 510. Connected by connectors 514 to respective word relationships 512 for subject/entity "ESMA" 510 are respective objects 516.

Figure 6:
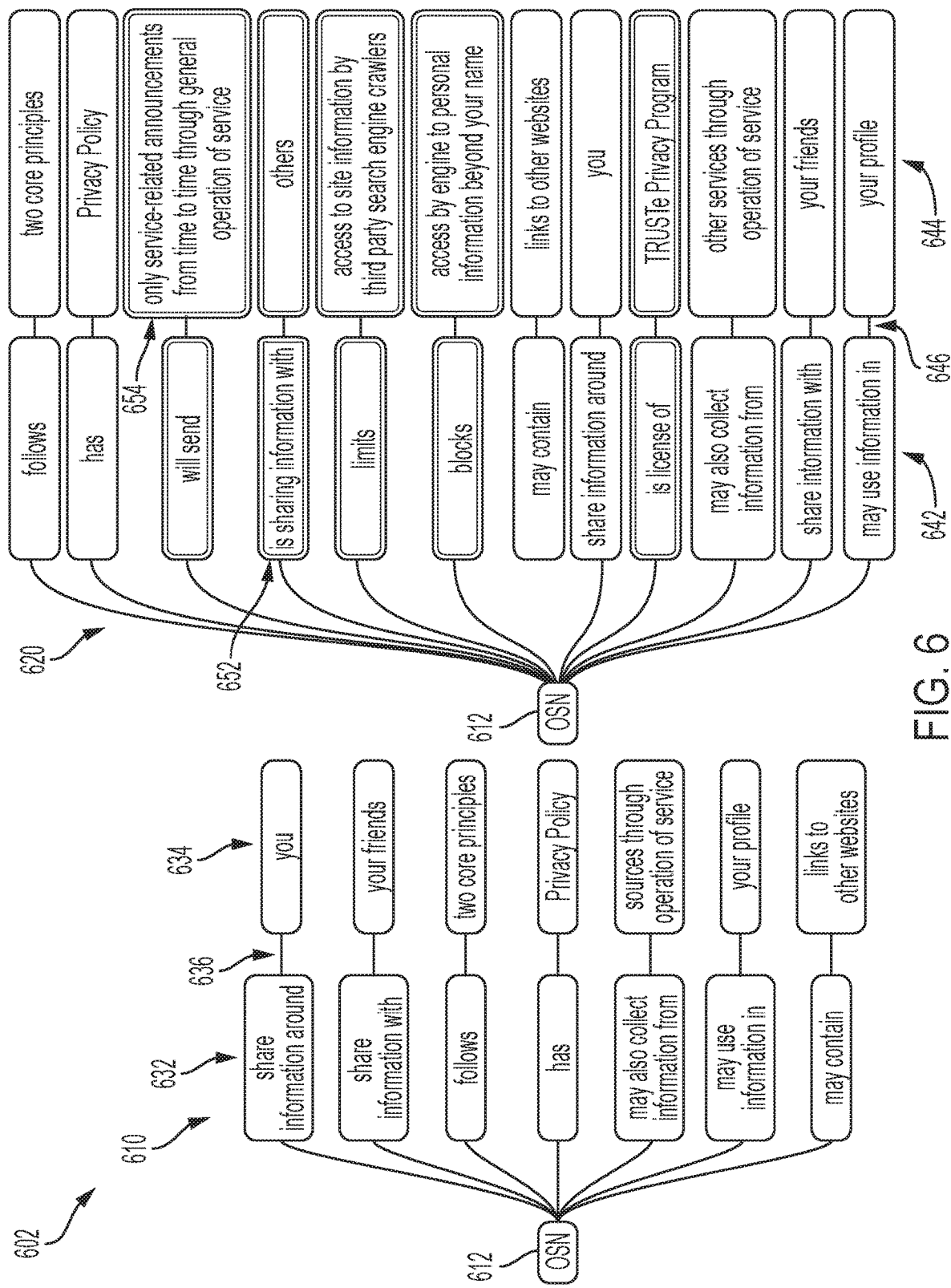
FIG. 6 is a schematic diagram illustrating two actionable item trees for a subject/entity according to an embodiment.

FIG. 6 illustrates a display 602, as viewed by a user, including an actionable item tree 610 for an original policy document for a subject 612, an online social network (OSN), and an actionable item tree 620 for a revised/amended policy document for subject 612. For subject 612 in actionable item tree 610 are word relationships 632. Also in actionable item tree 610 are respective objects 634 for respective word relationships 632 connected to respective word relationships 632 by connectors 636. For subject 612 in actionable item tree 620 are word relationships 642. Also in actionable item tree 620 are respective objects 644 for respective word relationships 642 connected to respective word relationships 642 by respective connectors 646. Revised/amended word relationships in the revised/amended policy document are indicated by double-line boxes 652 and revised/amended objects in the revised/amended policy document are shown as double-lined boxes 654.

Figure 7:
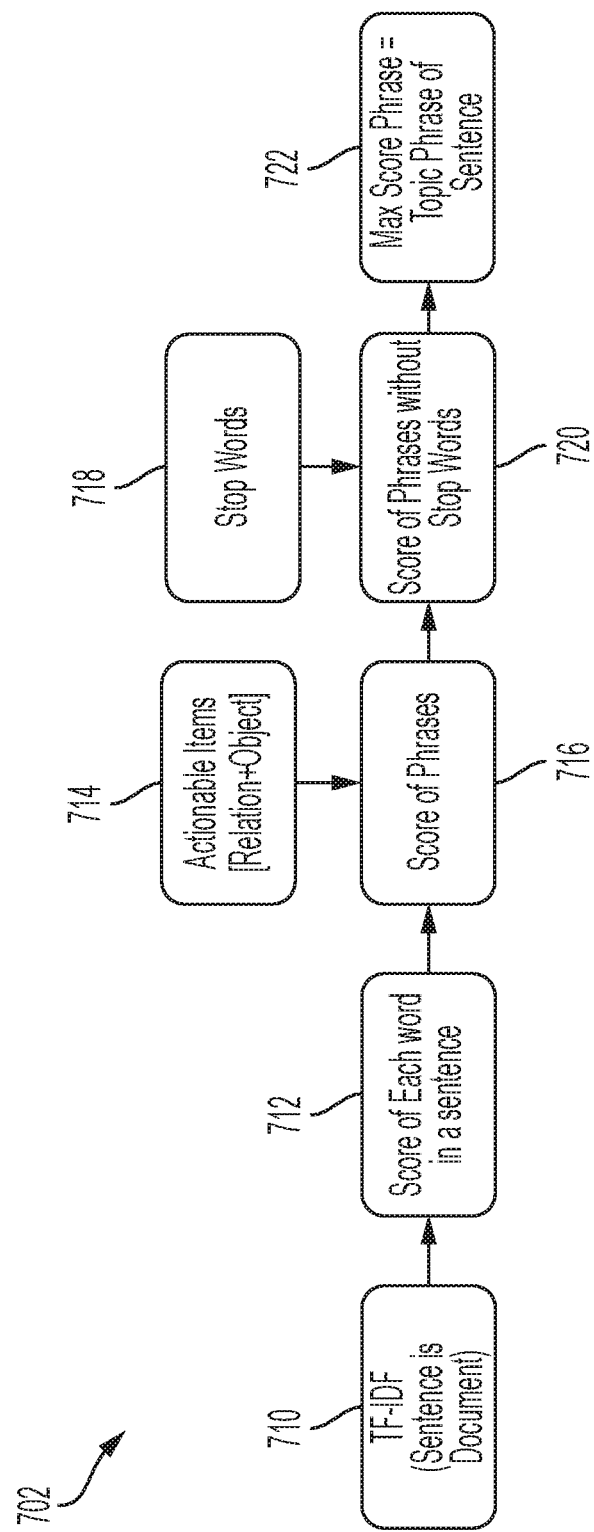
FIG. 7 is a schematic diagram illustrating a method for identifying the topic phrase of a sentence of a document according to an embodiment.

FIG. 7 illustrates a method 702 for identifying a topic phrase of a sentence of a document according to one embodiment of the present disclosure. At step 710 a TF-IDF model is trained with each sentence as a document. At step 712 a TF-IDF score is determined for each word in each sentence. For every actionable item associated with the sentence, concatenate relationship and object string for each subject, relationship, object triplet as indicated by box 714. At step 716, each relationship+object string is traversed 3 times n-gram tuples where $n \in (1,2,3)$. The TF-IDF scores for each word are summed, to thereby produce a combination of phrase and score, where the summation of scores depicts importance being given to 3 phrase then 2 phrase and finally 1 phrase words as required by problem statement. At step 718, any occurrence of stops words are removed, even within a phrase. A set of stop words 720 are produced based on NLTK stopwords, entities identified for the document, custom training of the AI-based document interpretation system implementing method 702. At step 722, the phrase that has the maximum sum of TF-IDF for the words in the phrase is determined to be the topic phrase for that sentence.

For example, using the method shown in FIG. 7 on the following sentence from General Data Protection Regulation (GDPR): "Article 8(1) of the Charter of Fundamental Rights of the European Union (the 'Charter') and Article 16(1) of the Treaty on the Functioning of the European Union (TFEU) provide that everyone has the right to the protection of personal data concerning him or her," produces the following scores for phrases: [('personal data', 0.14853848636322592), ('right', 0.13192635273334752), ('protection', 0.10015948304717648), ('personal', 0.08443009383323553), ('data', 0.06410839252999037)]. These results indicate that "personal data" is the topic phrase for this sentence, because "personal data" represents this sentence better than "rights from a themed corpus with is Financial Services Regulations."

Using the method shown in FIG. 7 on the following sentence from GDPR: "This Regulation is intended to contribute to the accomplishment of an area of freedom, security and justice and of an economic union, to economic and social progress, to the strengthening and the convergence of the economies within the internal market, and to the well-being of natural persons," produces the following scores for phrases: [('economic', 0.35796470784515333), ('intended contribute', 0.3530518799252209), ('accomplishment', 0.2748624916521586), ('internal market', 0.2672497154813985), ('contribute', 0.19602488006366595), ('internal', 0.1803726648248682), ('intended', 0.15702699986155494), ('market', 0.08687705065653027), ('strengthening', 0)] Even though "economic" is one word and "intended contribute" is two words, here "economic" is most important word and is the topic phrase that represents this sentence.

Using the method shown in FIG. 7 on the following sentence from GDPR: ": Directive 95/46/EC of the European Parliament and of the Council (4) seeks to harmonise the protection of fundamental rights and freedoms of natural persons in respect of processing activities and to ensure the free flow of personal data between Member States," produces the following scores for phrases: [('ensure free flow', 0.6697343540273878), ('free flow', 0.5373209799757168), ('ensure free', 0.37098726952022376), ('flow', 0.298747084507164), ('free', 0.2385738954685528), ('personal data', 0.19281644702454245), ('ensure', 0.132413374051671), ('states', 0.10991287554585323), ('personal', 0.109597930566388803), ('data', 0.08321851645815442)]. These results indicate that "ensure free flow" is the topic phrase for this sentence.

To cluster topic phrases according to one embodiment of the present disclosure involves a system of the present disclosure automatically using the following slope variance method to find the optimal number of clusters:
1. A TF-IDF model is created for topic phrases.
2. In the TF-IDF model, K=N/3 is initiated where N=number of sentences
3. An iterator with (10)D−2 is initiated where D=number of digits in K
4. The previous iterator is then initiated by the current iterator.

5. For each number of number of cluster, the previous iterator is traversed through K and is iterated by the iterator until the iterator=1.
   a. A K-means model is created with TF-IDF and the number of clusters.
   b. A count of items is found in each cluster as an output
   c. A variance of the output of 5.b. is found for each number of clusters.
6. For each point of the output of 5.c., i.e., each variance found, a degree slope of consecutive points is found based on Formula 1 below.
7. Then the first occurrence of two consecutive degree (θ) with values less than 10 is found.
8. K is then updated with the first number of clusters from step 6, D is updated with a new K value, the iterator is updated with a new D value and the previous iterator is updated with the last value of the number of clusters.
9. Step 5 is then repeated, where Formula 1 is as follows:

$$\theta = \tan^{-1(m)}; \text{ where } m = \frac{y2 - y1}{x2 - x1} \quad (1)$$

where θ=degree slope of points (x1,y1) and (x2,y2).

Figure 8:
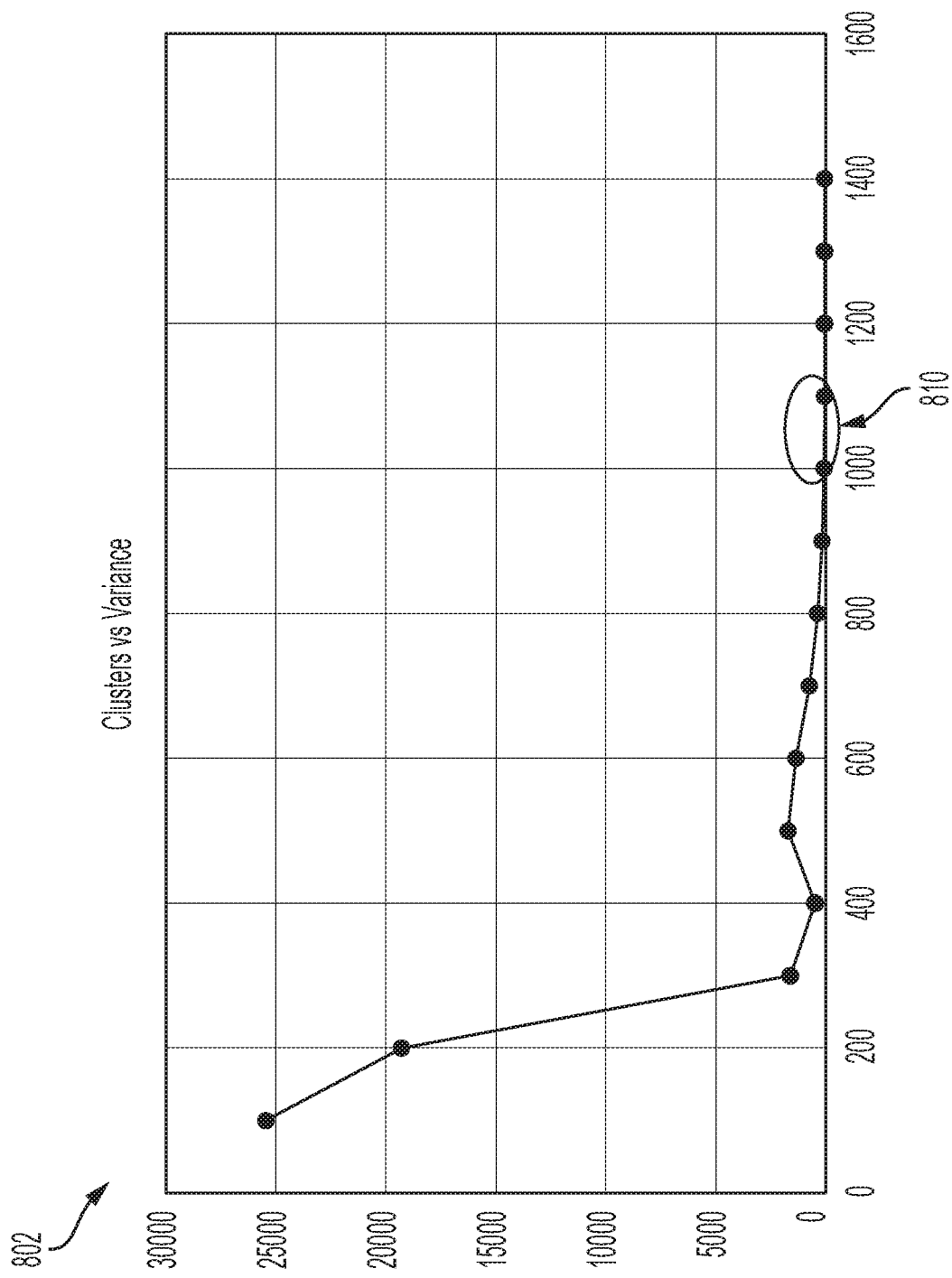
FIG. 8 is a graph of clusters v. variance for phrases of the sentences of a document.

FIG. 8 is a graph 802 of clusters v. variance for phrases of the sentences of a first document produced using the above-described slope variance method. Table 1 below shows the data upon which graph 8 is based:

TABLE 1

| Iterations | Variance |
|---|---|
| 100 | 25465.27 |
| 200 | 19280.66 |
| 300 | 1599.326 |
| 400 | 480.0581 |
| 500 | 1707.409 |
| 600 | 1344.362 |
| 700 | 729.9909 |
| 800 | 357.2456 |
| 900 | 159.1672 |
| 1000 | 65.74347 |
| 1100 | 44.17188 |
| 1200 | 44.36341 |
| 1300 | 41.90384 |
| 1400 | 41.64304 |

Table 2 below shows iterations, m and degree(e) for iterations 100 to 1300 of Table 1:

TABLE 2

| Iterations | m | degree(θ) |
|---|---|---|
| 100 | 61.84608581873497 | 89.07365540824443 |
| 200 | 176.81333856660433 | 89.6759567514103 |
| 300 | 11.192677195421162 | 84.8945142942691 |
| 400 | 12.273513522813937 | 85.34204298829226 |
| 500 | 3.630478541895436 | 74.60000581177727 |
| 600 | 6.143706872238089 | 80.7551439920665 |
| 700 | 3.727453287250242 | 74.98233400132335 |
| 800 | 1.9807840292552723 | 63.213045484083835 |
| 900 | 0.9342373301812235 | 43.05273503267749 |
| 1000 | 0.21571593322950292 | 12.173081978943403 |
| 1100 | 0.001915348858356154 | 0.10974127168161385 |
| 1200 | 0.024595768877737 | 1.408949680822263 |
| 1300 | 0.00260796397139778 | 0.14942498991371947 |

Encircled region 810 in graph 802 shows the first region where consecutive degree (θ) values are less than 10.

Figure 9:
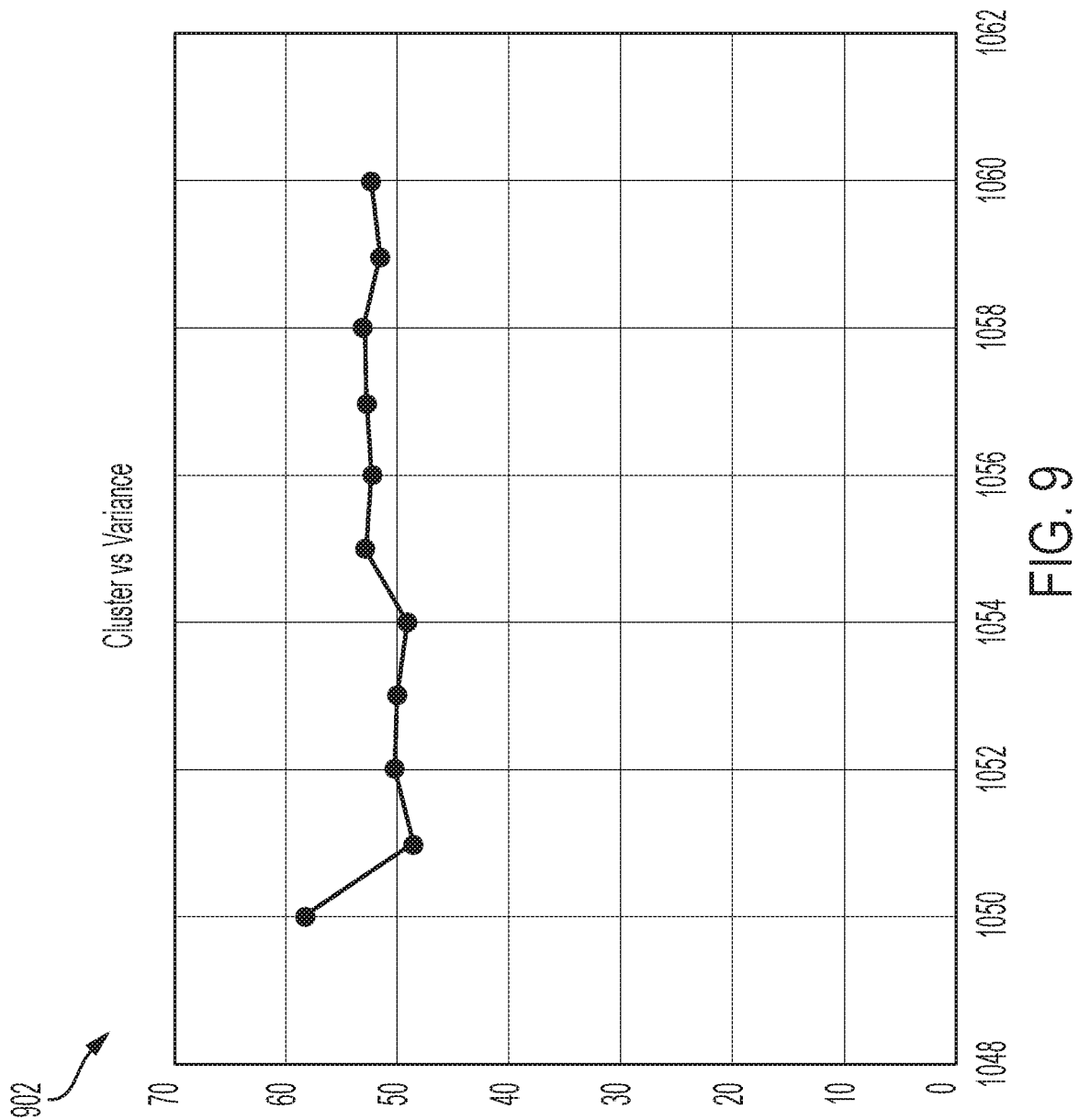
FIG. 9 is a graph of clusters v. variance for phrases of the sentences of a document.

FIG. 9 is a graph 902 of clusters v. variance for phrases of the sentences of a second document produced using the above-described slope variance method. Table 3 below shows the data upon which graph 9 is based:

TABLE 3

| Iterations | Variance |
|---|---|
| 1050 | 58.53364 |
| 1051 | 48.21373 |
| 1052 | 50.72252 |
| 1053 | 49.7606 |
| 1054 | 49.16576 |
| 1055 | 52.75564 |
| 1056 | 52.24367 |
| 1057 | 52.6839 |
| 1058 | 52.86249 |
| 1059 | 51.38224 |
| 1060 | 52.26065 |
| 1050 | 58.53364 |
| 1051 | 48.21373 |
| 1052 | 50.72252 |

Table 4 below shows iterations, m and degree(e) for iterations 1050 to 1059 of Table 3:

TABLE 4

| Iterations | m | degree($\theta$) |
|---|---|---|
| 1050 | 10.319905774572625 | 84.465312418008 |
| 1051 | 2.5087864884165754 | 68.26781917103202 |
| 1052 | 0.9619135877259097 | 43.88786303906832 |
| 1053 | 0.5948433803954671 | 30.746017711964562 |
| 1054 | 3.5898767637533098 | 74.4342316424977 |
| 1055 | 0.5119717501578762 | 27.111163994830566 |
| 1056 | 0.44023657615903034 | 23.760849748614046 |
| 1057 | 0.1785847382486807 | 10.125410676258335 |
| 1058 | 1.4802441631814887 | 55.958447026371395 |
| 1059 | 0.8784022765950183 | 41.29614546968236 |

Because there is no region in graph 902 where consecutive degree ($\theta$) values are less than 10, there is no optimal number of clusters, i.e., the variance is negligible.

In one embodiment of the present disclosure, clusters may automatically be labelled with a group label using the following method:
1. Find frequency of each word in all topic phrases
2. Assign the words with maximum frequency as Sub-Group Labels (temporary, until one is finalized) for each cluster
3. Perform Lemmatization on Sub-Group Labels
4. Perform Porter Stemming on Sub-Group Labels
5. Perform Lancaster Stemming on Sub-Group Labels
6. Perform English Stemming on Sub-Group Labels. Call it Stemmed Group Label (SG)
7. For Each combination of Stemmed Group Label (SG) and Sub-Group Label (SUB), use the below to find Group Label (GL)
   A. IF there exists 1 SUB for SG, THEN GL=SUB (Reverse stemming also address in this step for cases where SG not equals SUB)
   B. IF there exists >1 SUB FOR SG and SG MATCHES ONE OF SUB, THEN GL=SG THAT MATCHES SUB
   C. IF there exists >1 SUB FOR SG and SG DOES NOT MATCHES ANY SUB, THEN GL=SUB WITH THE MAX COUNT OF TOPIC PHRASES ASSOCIATED.
   In Case of conflict, Max count of sentences associated.
   In further case of conflict, pick SG with least word length as it's bound to be more generic.

Examples of the group labels produced by step 7.A of the cluster labelling method described in Table 5 below:

TABLE 5

| Label for Group | Topic Phrases in Cluster/Group |
|---|---|
| annex | annex |
| accurac | accuracy |
| acknowledg | acknowledging |

Examples of group labels produced by step 7.B of the cluster labelling method described in Table 4 below:

TABLE 6

| Label for Group | Topic Phrases in Cluster/Group |
|---|---|
| act | act action activities actions acts |
| abolish | abolish abolished |
| account | accountable accounts accountants |

Examples of group labels produced by step 7.0 of the cluster labelling method described in Table 7 below:

TABLE 7

| Label for Group | Topic Phrases in Cluster/Group |
|---|---|
| addit | additionally additional |
| compet | competent competence |

Examples of the types of groups produced by step 7.0 of the cluster labelling method described above are as follows (each group shown in parentheses): (addit addit additionally additional), (compet compet competent competence).

In some embodiments, based on predetermined criteria, such as a table of group labels and corresponding responsible parties is used to assign each group to a responsible party in a business. In some embodiments, the table of group labels and corresponding responsible parties may be stored in the document interpretation system of the present disclosure.

Figure 10:
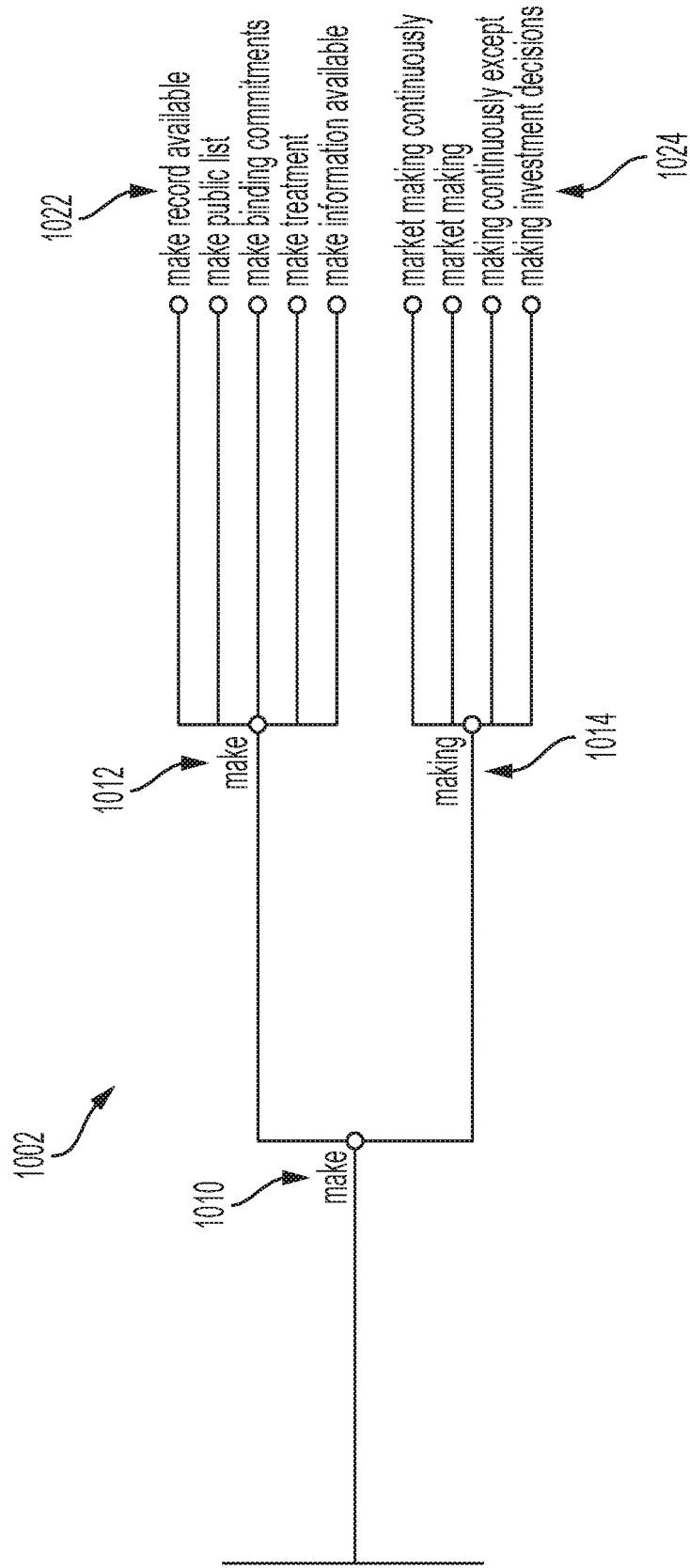
FIG. 10 is part of a display of a tree of groups vs topics for a document according to an embodiment.

FIG. 10 is part of a display of a tree of groups vs topics for a document as displayed to a user according to one embodiment of the present disclosure. The part of tree 1002 for group label "make" 1010 is shown in FIG. 10. For group label "make" 1010 there are two sub-group labels, sub-group label 1012 and sub-group label 1014. For sub-group label 1012 there are five topic phrases 1022. For sub-group label 1014 there are four topic phrases 1024.

Figure 11:
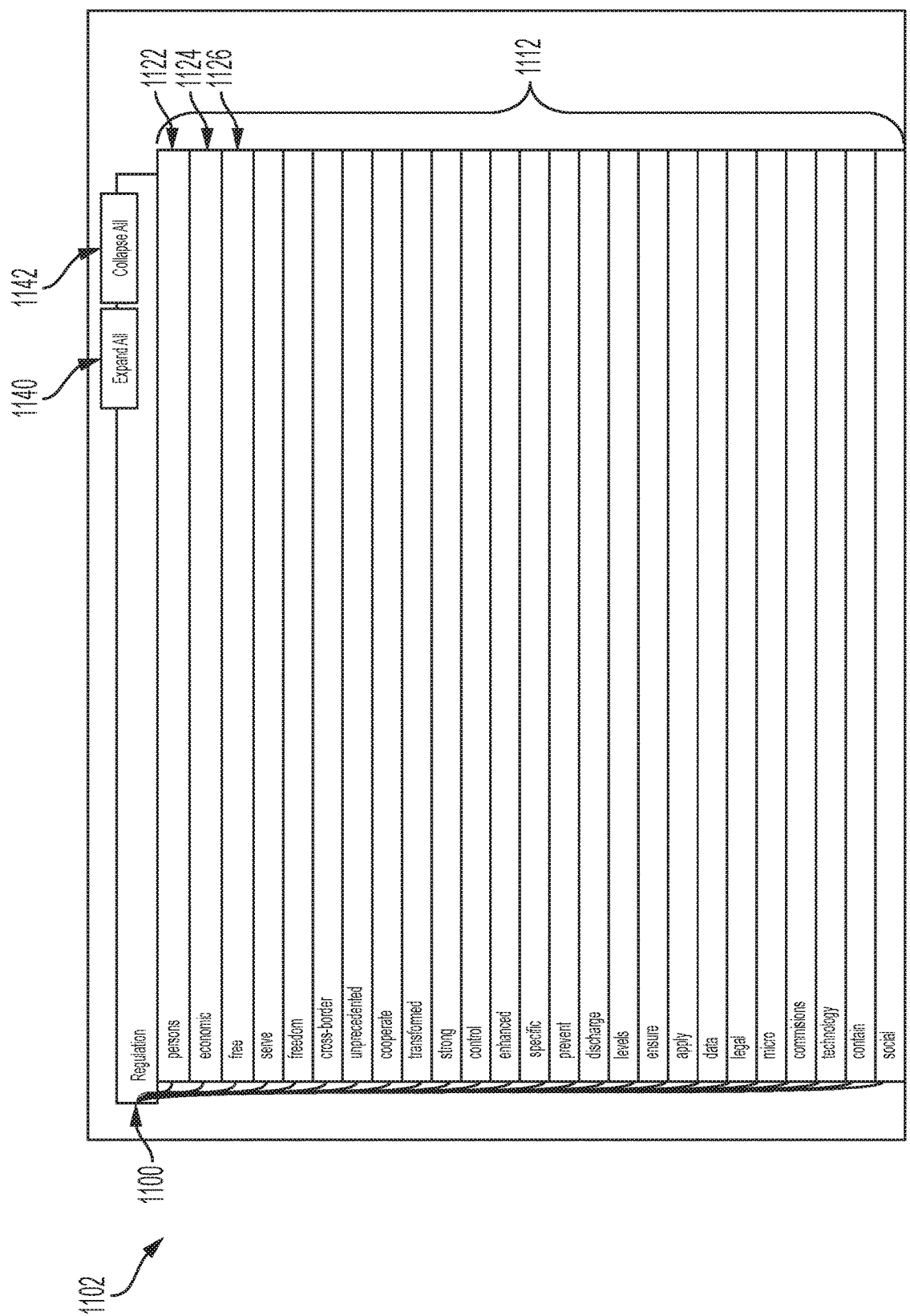
FIG. 11 is a screenshot of part of an expandable holistic view of group labels according to an embodiment.
Figure 12:
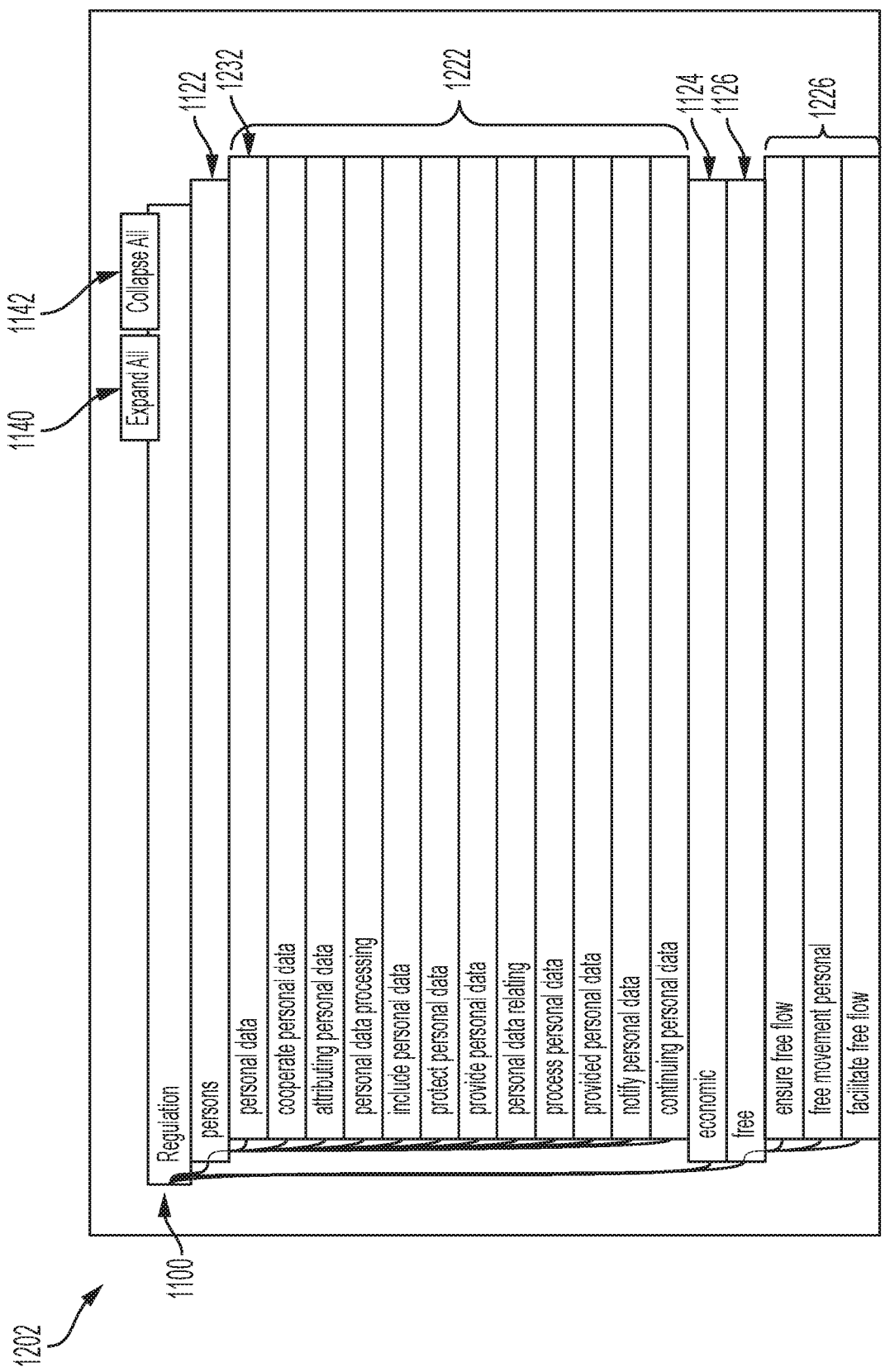
FIG. 12 is a screenshot of part of an expandable holistic view of group labels and topic phrases within each group according to an embodiment.

FIG. 11 is a screenshot of part of an expandable holistic view 1102 for a regulation 1110 for "regulation" and group labels 1112 for regulation 1110 as displayed to a user according to one embodiment of the present disclosure. In the full version of holistic view 1102, all of the group labels for regulation 1110, which may consist of one or more documents, assigned to a responsible party are displayed to a user/responsible party. Three of group labels 1112 shown in FIG. 11 are: group label 1122, i.e., group label "persons", group label 1124, i.e., group label "economic" and group label 1126, i.e., group label "free". Selecting Expand All button 1140 in FIG. 11 will cause the topic phrases for each group label 1112 to be displayed as illustrated in FIG. 12. Holistic view 1102 may be collapsed to only show regulation 1110 by a user/responsible party selecting Collapse All button 1142. If holistic view 1102 is displayed on a non-touchscreen, Expand All button 1140 and Collapse All button 1142 may be selected using various types of input devices such as a mouse, touchpad, trackball, etc. used to select items on a computer display. If holistic view 1102 is displayed on a touchscreen, Expand All button 1140 and Collapse All button 1142 may be selected by user touching Expand All button 1140 and Collapse All button 1142, respectively, with a finger, stylus or other means of selecting an item on a touchscreen FIG. 12 is a screenshot of part of an expandable holistic view 1202 of group labels produced by a user/responsible party selecting Expand All button 1140 in holistic view 1102 of FIG. 11 to display topic phrases 1222 for group label 1122 and topic phrase 1226 for group label 1126. No topic phrase is shown for group label 1124, because group label 1124 has not been expanded. Topic phrase 1232 of topic phrases 1222 is for the topic phrase "personal data"

Figure 13:
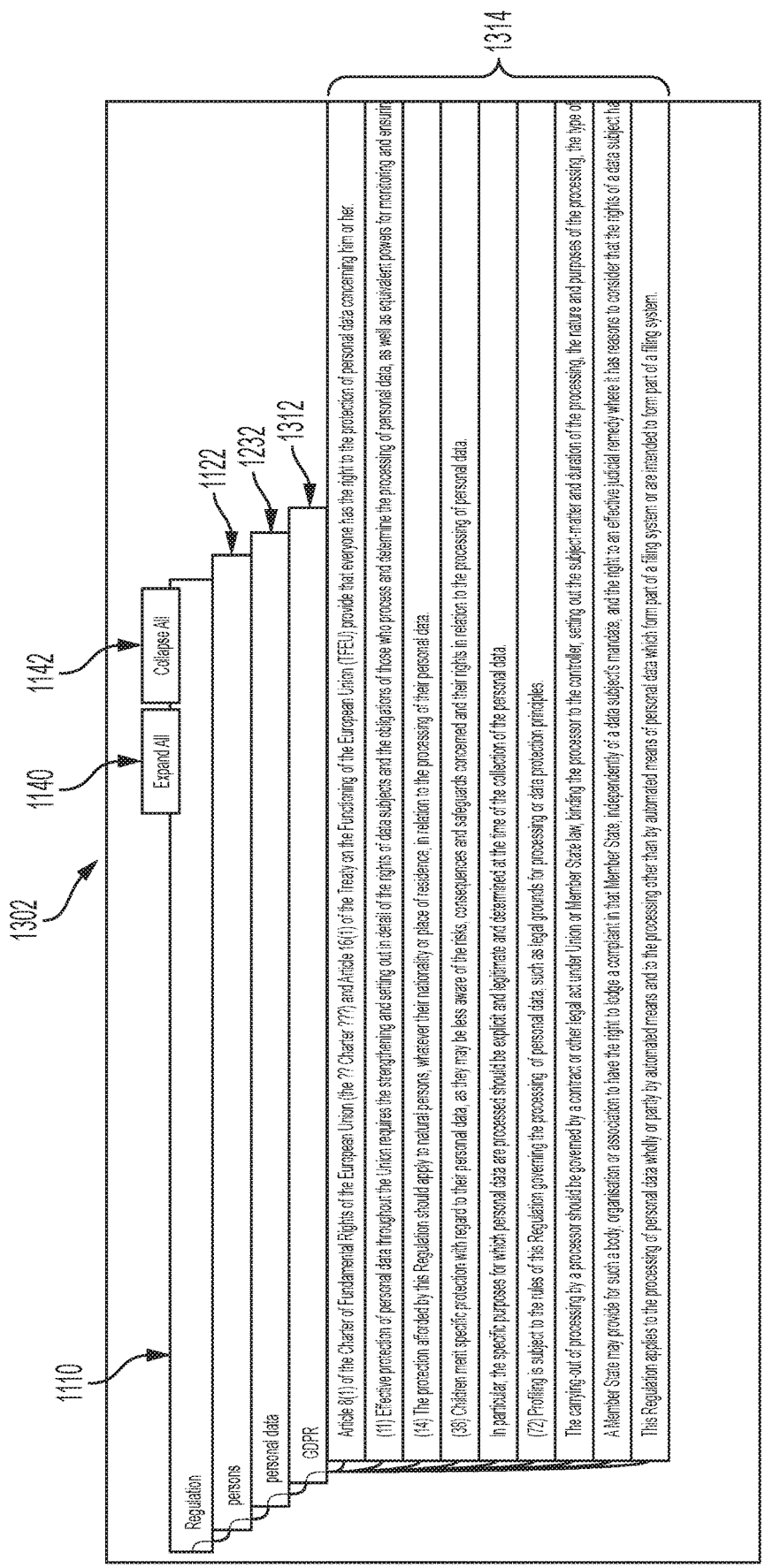
FIG. 13 is a screenshot of part of an expandable holistic view of illustrating a document name and sentences for a topic phrase according to an embodiment.

FIG. 13 is a screenshot part of an expandable holistic view 1302 of a document name 1312, i.e., document name GDPR, and sentences 1314 for topic phrase 1232 of FIG. 12 as displayed to a user/responsible party according to one embodiment of the present disclosure. Some of sentences 1314 are shown in truncated form. Expandable holistic view 1302 is produced by a user/responsible party twice selecting Expand All button 140 in FIG. 12.

In some embodiments, similar sentences may be found within each group by repeating for each group label the following two steps: 1. Train a Doc2Vec model of sentences and 2. Use genism.models.most_similar function to find most similar sentences.

Figure 14:
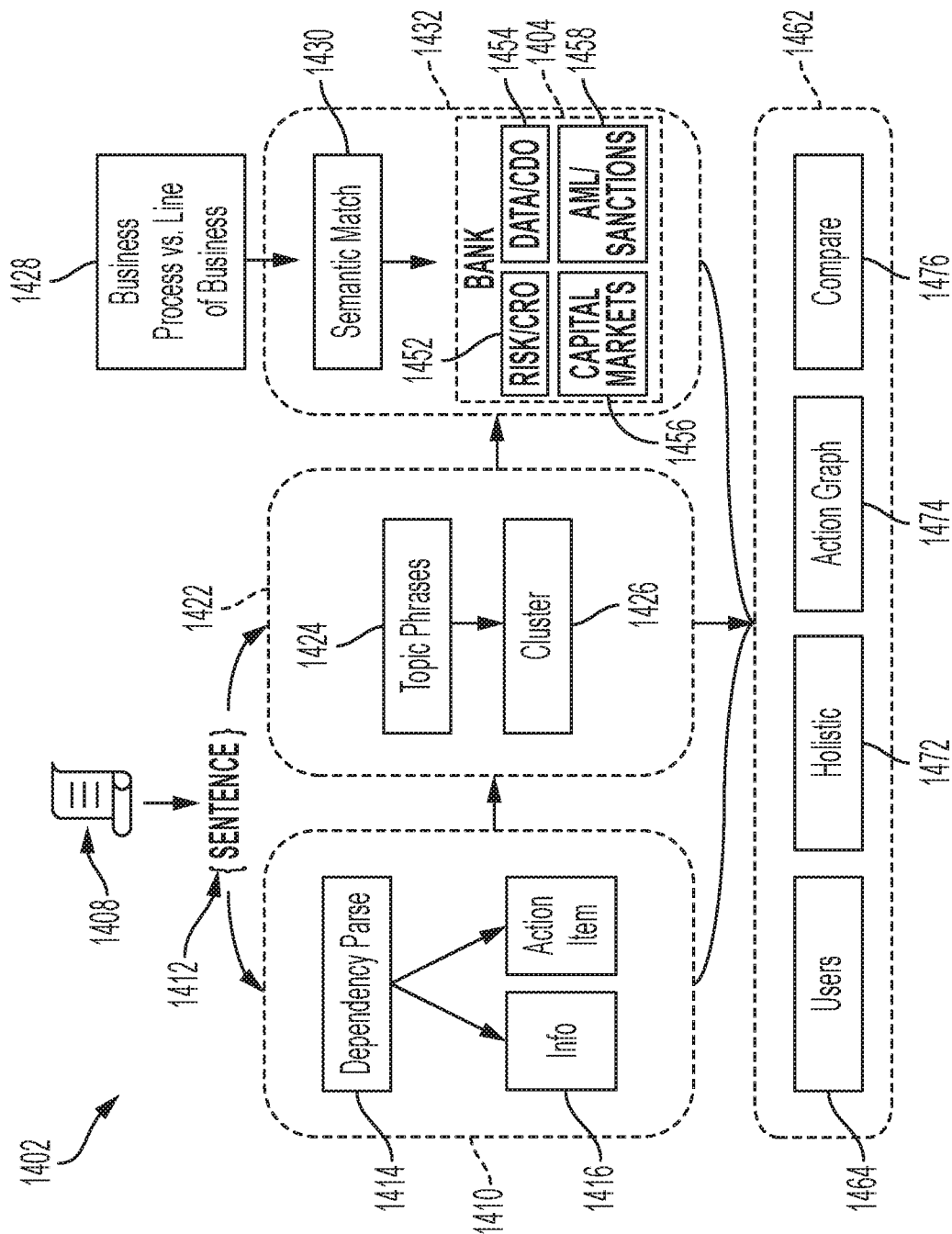
FIG. 14 is a schematic diagram of a document interpretation system according to an embodiment as used by a bank.

FIG. 14 is a schematic diagram of a document interpretation system, i.e. system 1402, as used by a bank 1404 according to one embodiment of the present disclosure. As shown in FIG. 14, documents 1408 including directives and amendments (not shown), are input into document interpretation system 1402. In interpret subsystem 1410 sentences 1412 of documents 1408 are dependence parsed to extract actionable items 1414 and information 1416. Information 1416 may be any piece of information that is not an actionable item 1414. For example, a sentence such as "This regulation is intended to contribute to accomplishment of area of freedom to progress strengthening within internal market," is information and not an actionable item. In group subsystem 1422 topic phrases 1424 of sentences 1412 are identified and clustered into clusters 1426. Based on business process and line of business information 1428 for bank 1404, semantic matches 1430 are made which allow assign subsystem 1432 to assign the appropriate actionable items from documents 1408 to the appropriate responsible parties of bank 1404 such as chief risk officer (CRO) 1452 of the risk management department, chief data officer (CDO) 1454 of the data management department, officer 1456 in charge of the capital markets department and officer 1458 in charge of the department overseeing anti-money laundering (AML) & sanctions enforcement. Interpret subsystem 1410, group subsystem 1422 and assign subsystem 1432 provide various types of views/displays 1462 to users 1464 including holistic views 1472, action graphs 1474 and comparison views 1476.

Although the exemplary embodiments presented herein are related to automatically interpreting documents relating to regulatory directives, the disclosed system and method may be used to automatically interpret other types of documents. For example, other types of documents may relate to legal contracts, information technology related documents and other types of documents. The regulatory directives may include regulatory directives for: financial services and banks, insurance, health care, other industries, etc. The legal contracts may be for: merger and acquisitions, investments, vendors/suppliers, 3$^{rd}$ parties, etc. The information technology related documents may include statements of work, service-level agreements, operational-level agreements, and requests for proposal. Other types of documents may include tax directives such as Foreign Account Tax Compliance Act (FATCA) documents and Small Goods & Services Tax (GST) documents; training manuals and training documents, Form 10Q company filings, Form 10K company filings; intellectual property; and terms & conditions/privacy policy documents.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for interpreting one or more documents to extract actionable items in the one or more documents and assigning the actionable items to responsible parties for the actionable items comprising:
   for each sentence of one or more sentences of each document of the one or more documents automatically extracting actionable items for each entity of one or more entities mentioned in each document;
   automatically identifying topic phrases for each sentence of the one or more sentences based on the extracted actionable items by performing the following:
      determining a term frequency-inverse document frequency (TF-IDF) score for each word for each of the one or more sentences;
      for every actionable item associated with each sentence, concatenating a relationship and object string for each subject, relationship, object triplet;
      traversing each relationship+object string of each subject, relationship, object triplet, 3 times n-gram tuples where n∈(1,2,3);
      summing the TF-IDF scores to thereby produce a combination of phrase and score, where the summation of scores depicts importance being given to 3 phrase then 2 phrase and finally 1 phrase words as required by a problem statement; and
      determining that the phrase for each sentence that has the maximum sum of TF-IDF scores for the words in the phrase for the sentence is the topic phrase for that sentence;
   automatically clustering the identified topic phrases into groups of topic phrases;
   automatically labeling each respective group of the groups of topic phrases with a respective group label;
   building a model for each group of topic phrases based on the respective group label for each respective group of the groups of topic phrases; and
   automatically assigning respective groups to one or more respective responsible parties in a business based on the respective group label for each group.

2. The method of claim 1, wherein the one or more documents comprise regulatory directives.

3. The method of claim 1, wherein the method comprises creating and displaying an actionable item tree for each subject, wherein the actionable item tree shows the subject, relationship, object triplets for the respective subject.

4. The method of claim 3, wherein automatically identifying topic phrases for each sentence of the one or more sentences based on the extracted actionable items comprises:
   removing stop words from each phrase.

5. The method of claim 1, wherein automatically clustering the identified topic phrases into groups of topic phrases comprises: using a slope variance method to find an optimal number of clusters.

6. The method of claim 1, wherein automatically labeling each respective group of the groups of topic phrases with a respective group label comprises:
   determining a respective sub-group label for each respective group based on the word with maximum frequency in the respective group;
   performing stemming on the sub-group label for each respecting group to thereby produce a stemmed group label for the respective group;
   determining the respective group label for each respective group based on the sub-group label and the stemmed group label for the respective group.

7. The method claim 1, wherein the method comprises displaying in an expandable holistic view topic phrases for the sentences of each document, the name of the document in which the sentences occur and the sentences for each document.

8. A non-transitory computer-readable medium storing software comprising instructions executable by one or more computers which, upon such execution, cause the one or more computers to:
   for each sentence of one or more sentences of each document of the one or more documents automatically extract actionable items for each entity of one or more entities mentioned in each document;
   automatically identify topic phrases for each sentence of the one or more sentences based on the extracted actionable items by performing the following:
      determining a term frequency-inverse document frequency (TF-IDF) score for each word for each of the one or more sentences;
      for every actionable item associated with each sentence, concatenating a relationship and object string for each subject, relationship, object triplet;
      traversing each relationship+object string of each subject, relationship, object triplet, 3 times n-gram tuples where $n \in (1,2,3)$;
      summing the TF-IDF scores to thereby produce a combination of phrase and score, where the summation of scores depicts importance being given to 3 phrase then 2 phrase and finally 1 phrase words as required by a problem statement; and determining that the phrase for each sentence that has the maximum sum of TF-IDF scores for the words in the phrase for the sentence is the topic phrase for that sentence;
   automatically cluster the identified topic phrases into groups of topic phrases;
   automatically label each respective group of the groups of topic phrases with a respective group label;
   build a model for each group of topic phrases based on the respective group label for each respective group of the groups of topic phrases;
   automatically determine sentence similarity within each group of topic phrases based on the model for each respective group;
   automatically assign respective groups to one or more respective responsible parties in a business based on the respective group label for each group.

9. The non-transitory computer-readable medium of claim 8, wherein the one or more documents comprise regulatory directives.

10. The non-transitory computer-readable medium of claim 8, wherein the instructions further cause the one or more computers to create and display an actionable item tree for each subject, wherein the actionable item tree shows the subject, relationship, object triplets for the respective subject.

11. The non-transitory computer-readable medium of claim 8, wherein automatically identifying topic phrases for each sentence of the one or more sentences based on the extracted actionable items comprises:
   removing stop words from each phrase.

12. The non-transitory computer-readable medium of claim 8, wherein automatically clustering the identified topic phrases into groups of topic phrases comprises: using a slope variance method to find an optimal number of clusters.

13. The non-transitory computer-readable medium of claim 8, wherein automatically labeling each respective group of the groups of topic phrases with a respective group label comprises:
   determining a respective sub-group label for each respective group based on the word with maximum frequency in the respective group;
   performing stemming on the sub-group label for each respecting group to thereby produce a stemmed group label for the respective group;
   determining the respective group label for each respective group based on the sub-group label and the stemmed group label for the respective group.

14. The non-transitory computer-readable medium of claim 8, wherein the instructions further cause the one or more computers to display in an expandable holistic view topic phrases for the sentences of each document, the name of the document in which the sentences occur and the sentences for each document.

15. A system for interpreting one or more documents to extract actionable items in the one or more documents and assigning the actionable items to responsible parties for the actionable items, comprising:
   one or more computers and one or more storage devices storing instructions that are operable, when executed by the one or more computers, to cause the one or more computers to:
      for each sentence of one or more sentences of each document of the one or more documents automatically extract actionable items for each entity of one or more entities mentioned in each document;
      automatically identify topic phrases for each sentence of the one or more sentences based on the extracted actionable items by performing the following:
         determining a term frequency-inverse document frequency (TF-IDF) score for each word for each of the one or more sentences;
         for every actionable item associated with each sentence, concatenating a relationship and object string for each subject, relationship, object triplet;
         traversing each relationship+object string of each subject, relationship, object triplet, 3 times n-gram tuples where $n \in (1,2,3)$;
         summing the TF-IDF scores to thereby produce a combination of phrase and score, where the summation of scores depicts importance being given to 3 phrase then 2 phrase and finally 1 phrase words as required by a problem statement; and
         determining that the phrase for each sentence that has the maximum sum of TF-IDF scores for the words in the phrase for the sentence is the topic phrase for that sentence;

automatically cluster the identified topic phrases into groups of topic phrases;

automatically label each respective group of the groups of topic phrases with a respective group label;

build a model for each group of topic phrases based on the respective group label for each respective group of the groups of topic phrases;

automatically determine sentence similarity within each group of topic phrases based on the model for each respective group;

automatically assign respective groups to one or more respective responsible parties in a business based on the respective group label for each group.

16. The system of claim 15, wherein the one or more documents comprises regulatory directives.

17. The system of claim 15, wherein the instructions further cause the one or more computers to create and display an actionable item tree for each subject, wherein the actionable item tree shows the subject, relationship, object triplets for the respective subject.

18. The system of claim 17, wherein automatically identifying topic phrases for each sentence of the one or more sentences based on the extracted actionable items comprises:
removing stop words from each phrase.

19. The system of claim 15, wherein automatically clustering the identified topic phrases into groups of topic phrases comprises:
using a slope variance method to find an optimal number of clusters.

20. The system of claim 15, wherein automatically labeling each respective group of the groups of topic phrases with a respective group label comprises:
determining a respective sub-group label for each respective group based on the word with maximum frequency in the respective group;
performing stemming on the sub-group label for each respecting group to thereby produce a stemmed group label for the respective group;
determining the respective group label for each respective group based on the sub-group label and the stemmed group label for the respective group.

* * * * *